Figure 1:
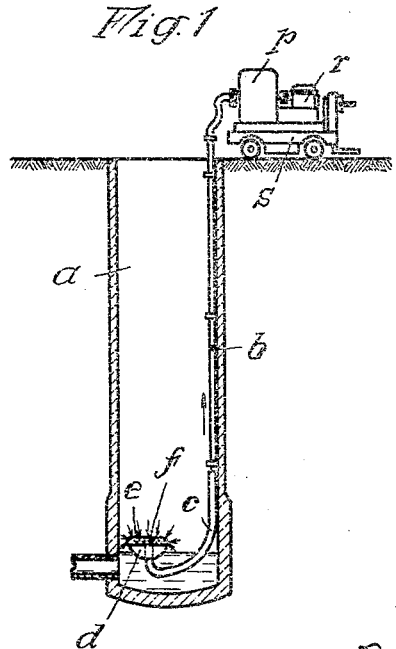

March 7, 1933. F. GERLACH 1,900,642
VENTILATING DEVICE FOR SUBTERRANEAN SPACES
Filed July 17, 1929 2 Sheets-Sheet 1

Inventor
Fritz Gerlach
by Knight Bro
attorney

March 7, 1933. F. GERLACH 1,900,642
VENTILATING DEVICE FOR SUBTERRANEAN SPACES
Filed July 17, 1929 2 Sheets-Sheet 2
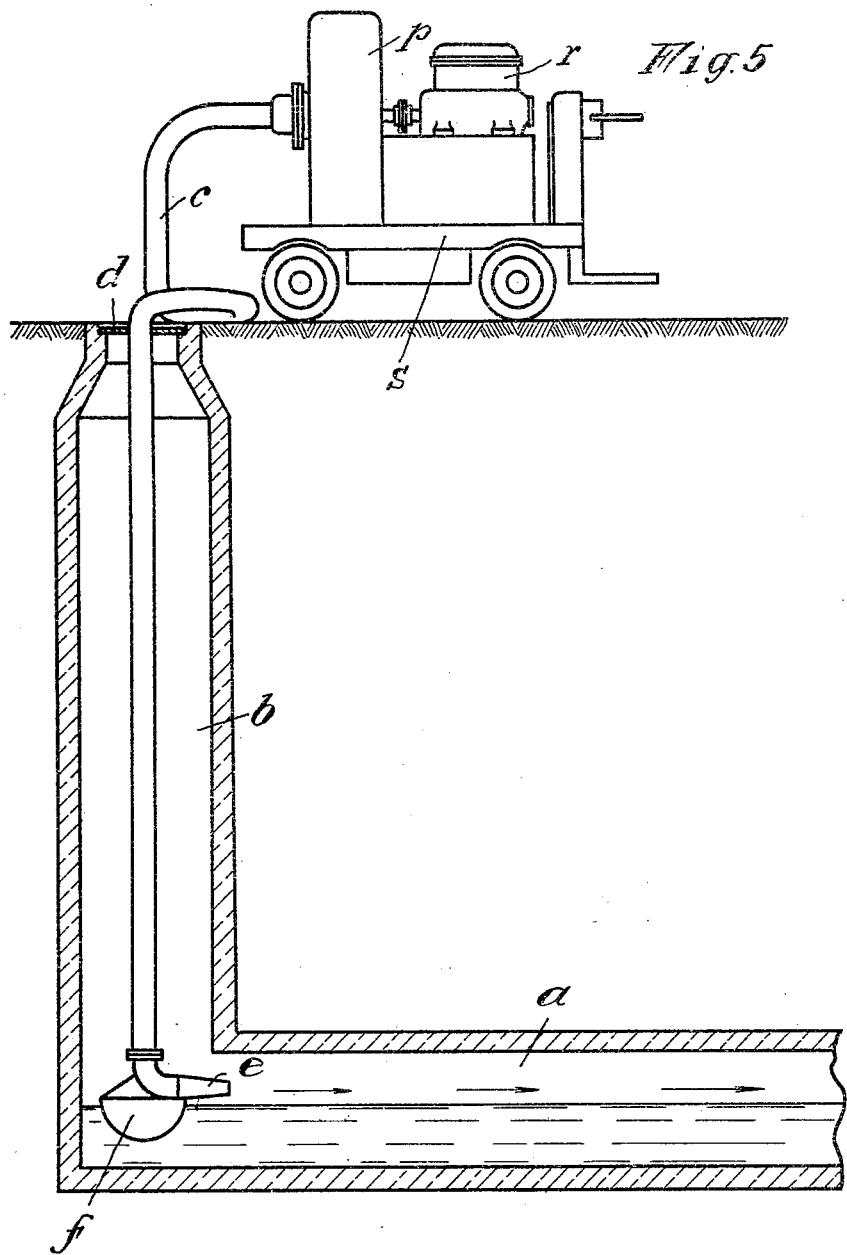

Patented Mar. 7, 1933

1,900,642

UNITED STATES PATENT OFFICE

FRITZ GERLACH, OF BERLIN-TEMPELHOF, GERMANY, ASSIGNOR TO SIEMENS-SCHUCK-ERTWERKE AKTIENGESELLSCHAFT, OF BERLIN-SIEMENSSTADT, GERMANY, A CORPORATION OF GERMANY

VENTILATING DEVICE FOR SUBTERRANEAN SPACES

Application filed July 17, 1929, Serial No. 378,924, and in Germany November 9, 1928.

My invention relates to improvements in the ventilation of subterranean spaces or chambers such as shafts, wells, pits, channels, conduits, and the like.

More particularly my invention relates to the ventilation of sewers in town sewerage systems and their inspection shafts and connecting conduits. It is well known that in the sewers of such sewerage systems gases develop which when mixed with air form explosive mixtures and are also very injurious to the health of human beings and frequently lead to serious illness and even to the death of workmen engaged in inspecting or cleaning the sewers. For this reason it is in many countries prescribed by the authorities that a safety lamp must be lowered into sewers before anybody descends into them and that this lamp must not be extinguished. Frequently, however, these conduits contain gases inflammable with difficulty, and which do not extinguish the lamp so that the lives of the workers are endangered in spite of the precaution.

One object of my invention is to remove all of these injurious gases in a simple manner. I attain this object by renewing in such subterranean conduits the air above the level of the water in conduits for waste waters or above the bottom in dry conduits. This may according to my invention be effected by exhausting the air mixed with heavy gases from the sewer whereupon fresh air enters through the inspection shaft from above or by forcing the air into the shaft and thereby forcing the injurious gases towards certain points of the sewer, for instance a second inspection shaft where they can escape. Since injurious gases are produced very slowly there is after their exhaustion no risk for the workmen for a considerable length of time.

In practicing my invention I employ a motor-driven air-pump and a spray head connected therewith which is preferably mounted on a float. The float with spray head is, for instance, prior to the cleaning of a sewer lowered into the inspection shaft or manhole until it floats upon the water, or in the case of dry conduits until it rests upon the bottom. Owing to the low position of the spray head the gases are removed directly above the level of the water or above the bottom of the conduit. The spray head is preferably connected to the pump by means of a hose. The flexible hose permits the float to rise and fall with the level of the rising or falling water.

In sewers or other conduits which must be cleaned frequently a stationary exhaustion or vacuum plant is preferably fixed within the inspection shaft. This plant may consist of a pipe to the lower end of which the float is attached by a rubber tube. The pipe terminates at the top just below the cover of the shaft so that after the removal of the cover a portable, preferably electrically operated air-pump may be connected to the pipe. The air-pump unit may be wheeled from shaft to shaft and sections of the sewer of any desired length may thus be ventilated. To effect an efficient ventilation of certain sections of the sewer it is advisable to cut off the adjacent sections and cross-conduits from the section to be cleaned by vertically movable partition walls, doors, slides and the like.

In sewers or other subterranean channels which are to be cleaned less frequently a stationary plant will not always prove economical. The spray head with float is connected in this case with the air-pump preferably by means of a long hose reaching down to the bottom of the underground conduit and the spray head with float is conveyed about on the truck upon which is mounted the pump unit.

My invention will be better understood on reference to the drawings affixed to my specification.

In the drawings a number of embodiments of my invention are illustrated in vertical section.

In the drawings

Figure 2:
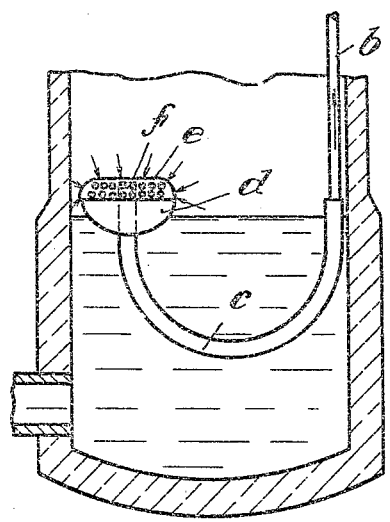
Figure 4:
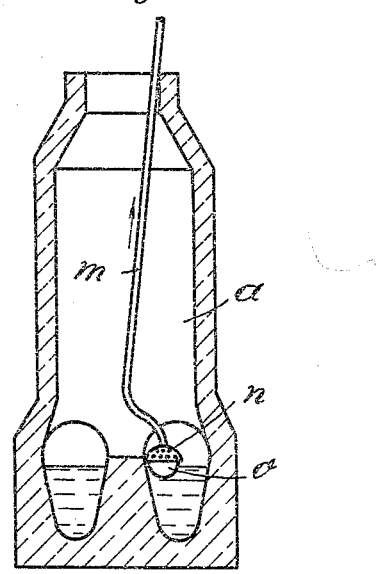

Fig. 1 shows a vertical section through a sewer inspection shaft fitted with a stationary suction or vacuum plant, Fig. 2, a suitable float for such an equipment on a larger scale, Fig, 3, a modified suction and float device, Fig. 4, a plant with portable suction implement, and Fig. 5, a plant operating with compressed air in contrast with the vacuum plant shown in the other figures.

Referring to Figures 1 and 2 it will be seen that in the inspection shaft $a$ of a sewer is fixed a pipe $b$. To the lower end of this pipe is connected a hose $c$ the other end of which is passed through a float $d$ and terminates in the spray head $e$ provided with perforations $f$. On the surface a pump unit is connected with the upper end of the pipe $b$. This unit consists of an air-pump $p$ and a motor $r$ driving said pump, both mounted on a suitable, preferably automotive truck.

Fig. 2 shows the lower portion of the shaft illustrated in Fig. 1 on a larger scale, it being assumed that the level of the water has risen in comparison with Fig. 1. The flexible hose $c$ has permitted the float to follow the water level.

Figure 3:
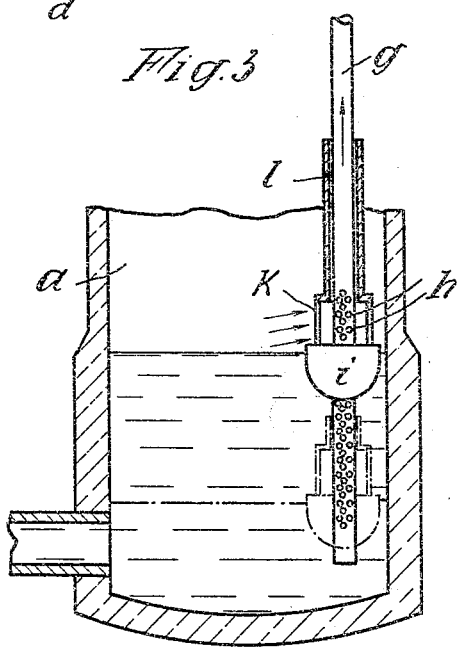

In Fig. 3 of the drawings is shown another construction of the exhaust and float device. The stationary pipe $g$ is at its lower end provided with perforations $h$. Along this pipe is adapted to slide the float $i$. In order that the air may be exhausted only directly above the level of the water another pipe $l$ is pushed over the pipe $g$ and connected with the float $i$ by webs $k$. When the float moves, for instance, downward with the falling of the water level the pipe $l$ covers the upper perforations $h$ up and uncovers only the perforations directly above the level of the water. The broken lines indicate the position of the float at a low level of the water.

In sewerage systems in which the sewers must be inspected frequently the gas exhausting equipment is preferably a permanent fixture, as mentioned before, and it is only necessary to move the pump unit from shaft to shaft and to connect the stationary piping with the pump. If, however, the shafts are used occasionally only a stationary equipment will hardly be economical. In such cases portable equipment will preferably be employed. In such a device a flexible pipe, such as a rubber hose $m$ shown in Fig. 4 will be used which communicates with a suction basket $n$ and carries a float $o$ at the bottom. When it is desired to ventilate a shaft or sewer by this apparatus the workman lowers the float with suction basket until he notices by the reduction in weight that the float rests either upon the surface of the water or on the dry ground.

To the pipe $m$ is connected the air pump which is then started and draws the injurious gases out of the shaft.

In Fig. 5 of the drawings another apparatus for the ventilation of the sewers of sewerage systems is shown in which the sewer is cleaned of injurious gases by means of compressed air. Into the inspection shaft $a$ is lowered a pipe $b$ which is connected to the air pump $p$ by a hose $o$. The pipe terminates at the bottom in a horizontal nozzle $q$. This nozzle rests upon the float $d$, as in the foregoing modification. The air pump $p$ forces fresh air into the pipe which issues from the nozzle $q$. The powerful stream of air then forces the heavy gases resting upon the water in the direction of the arrow through the conduit $t$ and drives them out of the next inspection shaft. In order that the orifice of the nozzle may always point in the direction of the conduit $t$ a mark indicating the position of the nozzle may be provided on the air supply pipe (not shown). To prevent the fresh air blown through the nozzle $q$ in the direction of the sewer $t$ from deviating sideways and injurious gases from entering through branch sewers opening laterally into the main sewer, and thus to prevent the sewer from being cleaned only to an unsufficient extent, such branches should preferably be closed by suitable means, such as slides, doors or the like (not shown).

Various modifications and changes may be made without departing from the spirit and the scope of the invention.

I claim as my invention:

Ventilation device for subterranean spaces, such as sewers, their connecting conduits and inspection shafts, comprising an air-pump, a driving motor for said air-pump, a stationary pipe mounted in said inspection shaft terminating at its lower end at about the lowest level of the sewage and connected at its upper end with said pump, said pipe being perforated from a point adjacent the lower end to a point above the maximum level of the sewage, a pipe section slidably mounted upon the lower end of said stationary pipe, a float, means supporting said pipe section on said float so that the lower end of said pipe section is above said float, said float being adapted to hold said pipe section in position to cover the perforations in said stationary pipe except those a short distance above the surface of the sewage and those below the sewage.

In testimony whereof I affix my signature.

FRITZ GERLACH.